(12) United States Patent
Barich et al.

(10) Patent No.: US 6,437,705 B1
(45) Date of Patent: Aug. 20, 2002

(54) RAILCAR MAINTENANCE MANAGEMENT SYSTEM

(75) Inventors: David J. Barich; Daniel M. Barich, both of Frankfort; Timothy P. Donahue, Wheaton, all of IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/725,614

(22) Filed: Nov. 29, 2000

(51) Int. Cl.$^7$ .............................................. G08G 1/095
(52) U.S. Cl. ...................... 340/907; 340/909; 340/910; 105/26.1; 246/168; 246/169 R; 104/27
(58) Field of Search ................................. 340/907, 933, 340/909, 910; 246/1 R, 5, 13–14, 169 R, 168; 701/19, 20; 105/26.1; 104/26.1, 27

(56) References Cited

U.S. PATENT DOCUMENTS

| | | | |
|---|---|---|---|
| 1,560,878 A | 11/1925 | Tatum | 118/697 |
| 2,948,234 A | 4/1960 | Hughson | 104/88.04 |
| 2,951,452 A | 9/1960 | Karlet | 104/26.1 |
| 3,944,986 A | 3/1976 | Staples | 104/26.1 |
| 4,770,122 A | 9/1988 | Ichihashi et al. | 118/697 |
| 5,072,900 A | * 12/1991 | Malon | 246/5 |
| 5,445,347 A | * 8/1995 | Ng | 246/169 R |
| 5,867,801 A | * 2/1999 | Denny | 701/35 |
| 5,947,423 A | * 9/1999 | Clifton et al. | 246/62 |
| 6,154,735 A | * 11/2000 | Crone | 706/45 |
| 6,263,265 B1 | * 7/2001 | Fera | 701/19 |

* cited by examiner

Primary Examiner—Jeffery Hofsass
Assistant Examiner—Davetta W. Goins
(74) Attorney, Agent, or Firm—McDermott, Will & Emery

(57) ABSTRACT

The present invention relates to a system and a method for managing the repairing, cleaning, painting, or otherwise maintaining of railcars within a railcar maintenance facility. Specifically, the present invention relates to a railcar maintenance management system and method for maintaining railcars within a facility wherein the facility has an inbound track, an outbound track, and a plurality of maintenance stations for moving a railcar in and out of the facility and for repairing, cleaning, or painting the same. Further, the railcar maintenance management system and method allows for efficient movement of railcars through the facility by queueing the railcars at strategic locations within the railcar facility.

14 Claims, 5 Drawing Sheets

FIG.1

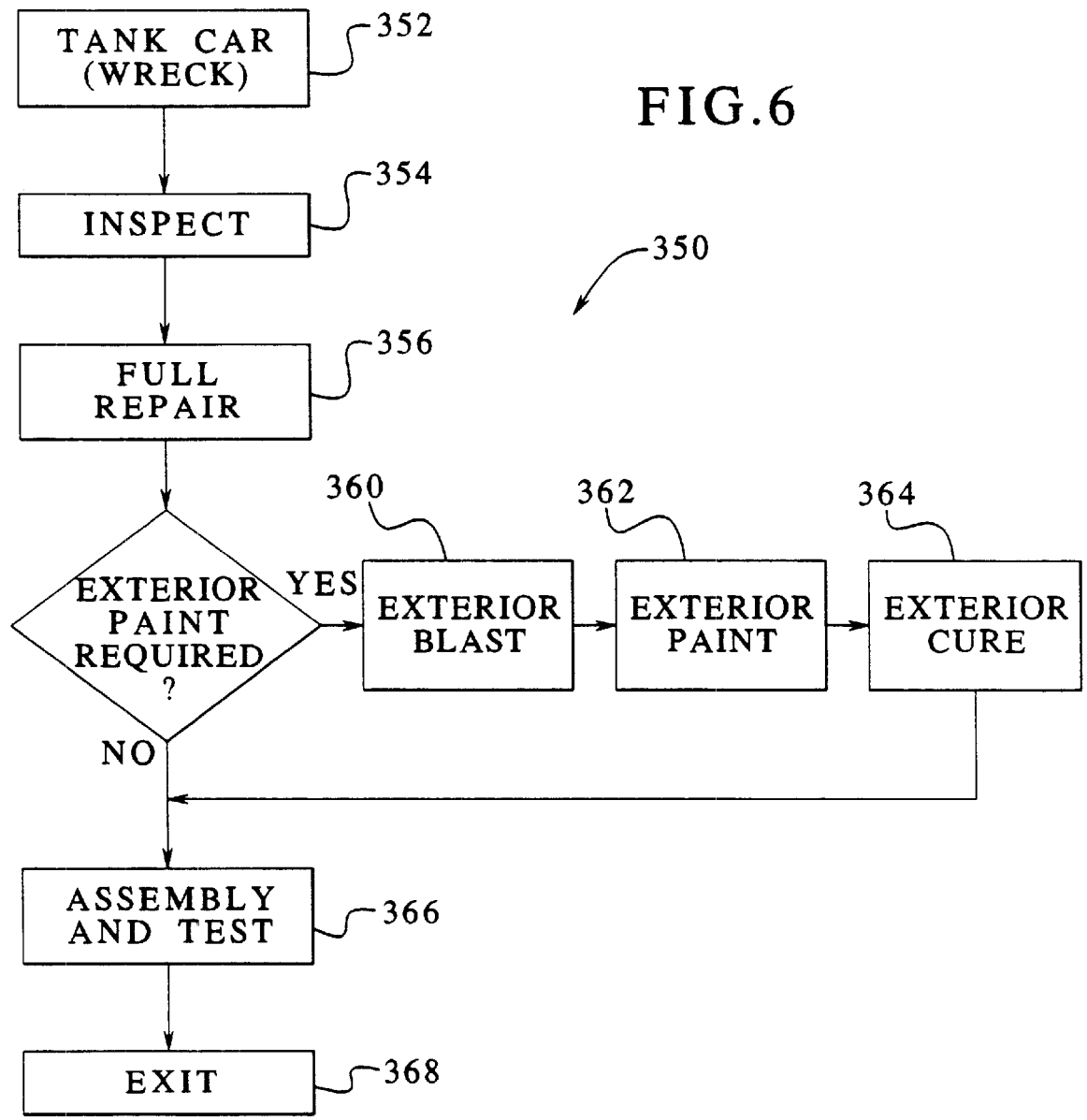

RAILCAR MAINTENANCE MANAGEMENT SYSTEM

FIELD OF INVENTION

The present invention relates to a system for managing the repairing, cleaning, painting, or other maintenance of railcars within a railcar maintenance facility. Specifically, the present invention relates to a system for managing the maintenance of railcars within a facility wherein the facility has an inbound track, an outbound track, and a plurality of repair stations for moving a railcar in and out of the facility and for repairing, cleaning, or painting the same. Moreover, the invention relates to a management system that has a plurality of communication devices for signaling the availability of maintenance stations within the maintenance facility. Further, the railcar repair process allows for efficient movement of railcars through the facility by queuing the railcars at strategic locations within the railcar facility.

BACKGROUND OF THE INVENTION

The railcar industry presently suffers from high costs associated with railcar repair. Regularly scheduled repair and maintenance, along with the inevitable number of wrecks and bad orders, cause some percentage of each fleet of railcars to be out of service at any given time. While out of service for repair, a railcar is unable to generate income for the owner of the railcar. Thus, it is desirable to minimize the throughput time of a repair facility and maximize the efficiency of the railcar's service time. Additionally, decreasing the throughput time for repair facilities allows the industry to rely on smaller fleets, as fewer backup railcars are needed. Furthermore, it is desirable to minimize the variability of a repair facility's throughput time to promote accurate estimates of when railcars will return to service. Accurate estimates of throughput time decrease costs to the industry by reducing the need for redundant planning.

Traditionally, railcar repair facilities, as well as many other manufacturing operations, release product into the facility as soon as it arrives regardless of the state of the production system. Railcar repair facilities traditionally consist of a series of maintenance stations located sequentially along a continuous track. The assembly-line repair method and repair facility design may be appropriate when working with a standardized product that requires uniform treatment at each stage of the assembly-line procedure. However, pushing railcars with individual repair process requirements through an assembly-line repair facility leads to inconsistent throughput performance with large backlogs, increased work-in-process levels, and increased cycle times having high levels of variation. If a single railcar is delayed due to lengthy repair work or a shortage of necessary materials, every railcar in the facility behind the delayed railcar may also be delayed. Thus, a single railcar can create a work-in-process bottleneck effecting the entire repair production system. These bottlenecks may cause the high throughput times and the equally high variability of throughput times of traditional railcar repair facilities. Moreover, typical maintenance processes fail to identify the process bottleneck, thereby leading to solutions that fail to provide constant work to the bottleneck. Failure to identify the process bottleneck may lead to inefficiencies, otherwise known as "bottleneck starving."

A major limitation of the assembly-line process is the inability to implement any form of bottleneck planning. In a traditional railcar repair facility, high levels of work-in-process hide the bottleneck operation preventing the facility from running at its highest efficiency. One key to improving a maintenance facility's efficiency is to identify the bottleneck operation and ensure that process is in continuous operation.

Accordingly, it would be desirable to improve the efficiency and predictability of railcar repair by identifying a facility layout capable of eliminating unnecessary work-in-process bottlenecks. Further, it is desirable to implement a railcar maintenance facility having a plurality of stations to service a plurality of types of railcars having a plurality of maintenance needs.

SUMMARY OF THE INVENTION

The present invention relates to a railcar maintenance management system. More specifically, the present invention relates to a system and a method for managing the repairing, cleaning, painting, or otherwise maintaining of railcars within a railcar maintenance facility. Further, the railcar repair process allows for efficient movement of railcars through the facility by queuing the railcars at strategic locations within the railcar facility.

Therefore, it is an advantage of the present invention to utilize a process layout facility to optimize both efficiency and predictability of railcar repair.

It is an additional advantage of the present invention to employ customized routing patterns through the maintenance facility based on the individual maintenance needs of each railcar.

And it is an additional advantage of the present invention to optimize workstation efficiency by eliminating work-in-process bottlenecks within the railcar maintenance facility.

Still further, it is an advatnage of the present invention to increase workstation utilization within the railcar maintenance facility by providing workstations capable of servicing multiple product types.

And it is an additional advantage of the present invention to prevent the identified bottleneck process from starving.

It is a further advantage of the present invention to provide a railcar maintenance facility that utilizes a system of queues to efficiently move railcars that need maintenance through the facility.

These and other advantages of the present invention will become apparent upon examining the drawings and figures together with the accompanying written description thereof.

BRIEF DESCRIPTION OF THE DRAWINGS

The present invention will be hereafter described by way of example with reference to the following drawings:

FIG. 1 represents a plan view of the railcar maintenance facility having inbound and outbound rails, queues, transfer tables, and maintenance stations in an embodiment of the present invention.

FIG. 6 illustrates a flowchart for a wrecked hopper railcar requiring specific maintenance in an embodiment of the present invention.

DETAILED DESCRIPTION OF THE PRESENTLY PREFERRED EMBODIMENTS

Figure 2:
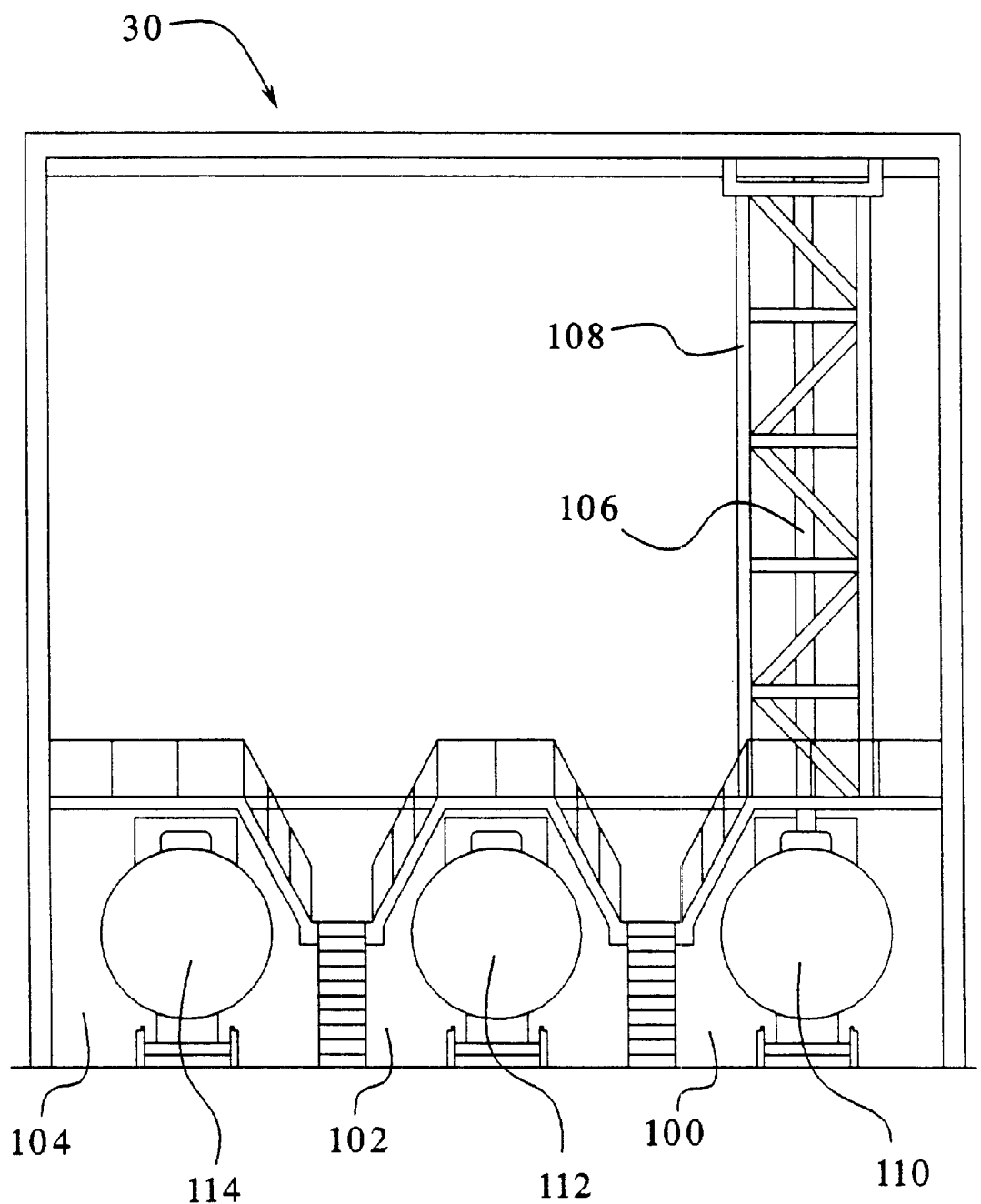
FIG. 2 is a perspective view of an interior blast workstation in an embodiment of the present invention.

The present invention relates to a railcar maintenance management system for cleaning, repairing, painting, and/or otherwise maintaining railcars. Specifically, the present invention relates to a management system for maintaining railcars that allows for efficient movement of railcars through a maintenance facility by queuing the railcars at strategic locations and by communicating the availability of maintenance stations within the railcar maintenance facility.

Railcar Maintenance Facility

Figure 1:
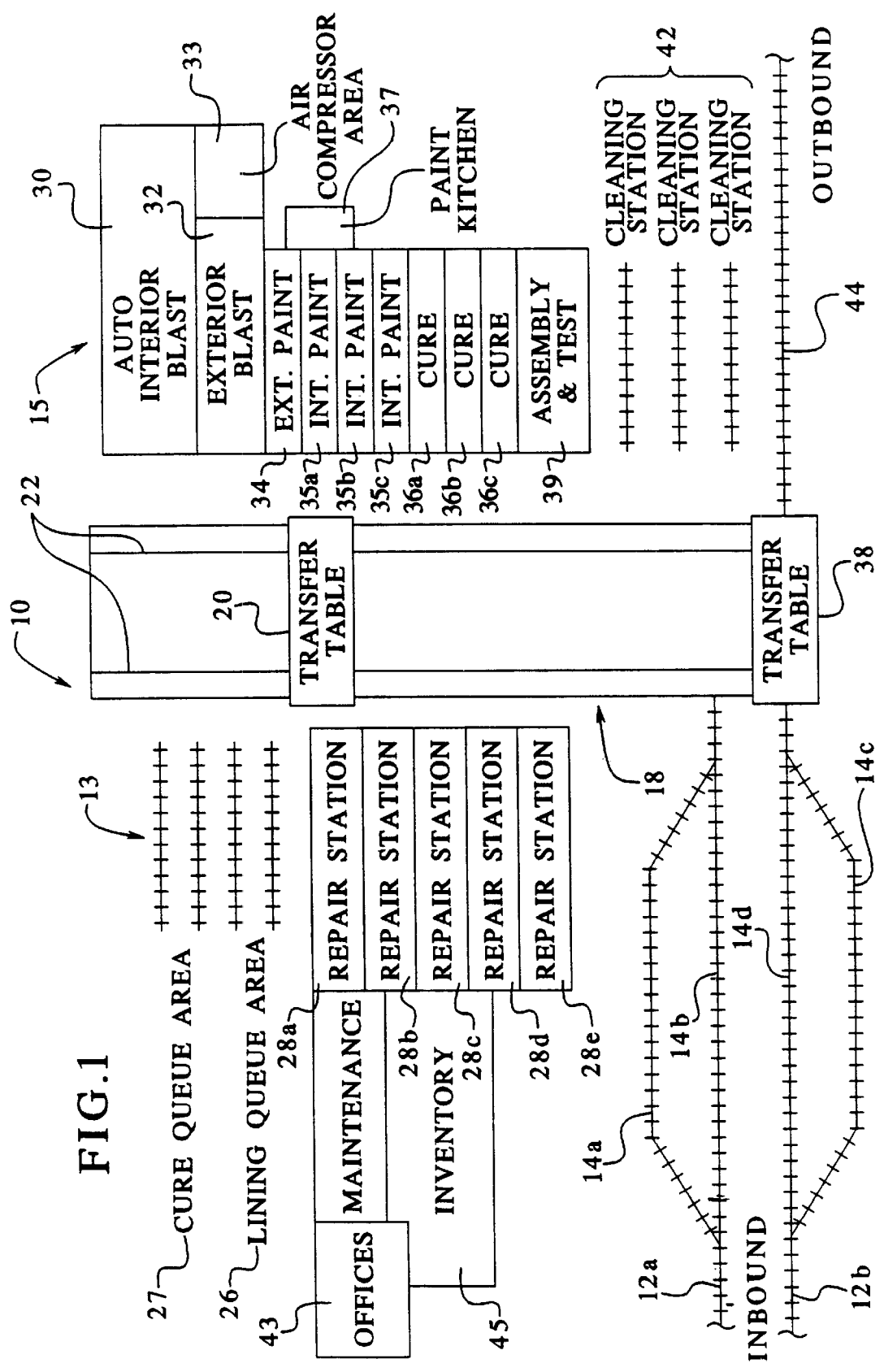

FIG. 1 illustrates an embodiment of the present invention showing a railcar maintenance facility 10 for maintaining a plurality of railcars. Railcars may include hoppers, pressurized storage and/or transport tanks and/or any other means for holding, storing and/or transporting goods via railway. For example, a typical railcar serviced by the railcar maintenance facility 10 may be a tank car having a lining therein for transporting corn syrup, citric acid, starches and/or ethanol.

In FIG. 1, the railcar maintenance facility 10 may include inbound railways 12a,12b leading to a series of railways acting as inbound queues 14a–14d. Railcars entering the facility 10 may enter via a single railway (not shown) and may be sorted at an inspection station (not shown) based on particular types of railcars and particular types of maintenance to be completed on the railcars. For example, maintenance may include cleaning the railcar or components thereof, repairing, painting, and/or any other maintenance activity apparent to those skilled in the art.

An inspector within the inspection facility may direct each inbound railcar to the proper inbound queue 14a–14d based on the type of railcar and/or the type of work to be performed thereon. Moreover, the inspector may label the inbound railcars with maintenance facility routing schedules (not shown) according to each railcar's product type and maintenance requirements. For example, the inspector may prepare a color coded magnetic routing schedule and adhere the schedule on each railcar to indicate the routing pattern the railcar will take through the maintenance facility 10. The schedule may further include a list of required operations having a check box located adjacent to each operation listed. Upon completion of each operation, the corresponding check box may be marked and signed thereby initiating the next operation on the schedule.

A railcar entering the facility 10 may be classified, for example, as either "light" or "heavy" based on the amount of work to be performed thereon. "Light" maintenance may refer to exterior or interior cleaning, exterior painting, minor repair, and/or any other maintenance apparent to those skilled in the art as being "light". Alternatively, "heavy" maintenance may refer to major repair and/or any other maintenance apparent to those skilled in the art.

A railcar designated as "light" may be routed to the facility 10 via the inbound railway 12a. Moreover, inbound queues 14a,14b may be utilized to hold railcars until the facility 10 has the capabilities to have the work performed thereon. Further, railcars designated as needing "heavy" maintenance work thereto may be routed to the facility via the inbound railway 12b. A railcar may be queued in inbound queues 14c,14d. The inbound queues 14a–14d may hold and/or store railcars until stations are free within the facility that may be necessary to carry out the required maintenance on the railcars.

In an alternate embodiment of the invention illustrated in FIG. 1, there may be four inbound queues 14a–14d. One queue, such as, for example, 14b, may be designated for railcars requiring only repair service. A second queue, such as, for example, 14a, may be designated for railcars requiring only repair service but are waiting for the arrival of repair parts to the repair facility 10, as noted above. A third queue, such as, for example, 14d, may be designated for railcars requiring repair service and lining service. A fourth queue, such as, for example, 14c, may be designated for railcars requiring repair service and lining service but are waiting for the arrival of repair parts to the repair facility 10. As specified above, these queues may be utilized to hold railcars before the railcars enter the railcar maintenance facility 10 for specific types of maintenance. However, the types of maintenance should not be limited as noted above. Any type of maintenance may be carried out within the railcar maintenance facility 10. Further, it should be noted that the queues may be utilized for any purpose apparent to those skilled in the art and should not be limited as herein described.

The inbound queues 14a–14d for the sorted railcars may terminate at a transfer area 18 that may be used to transfer railcars throughout the railcar maintenance facility 10 based on the type of maintenance needed. A primary transfer table 20 may be located within the transfer area 18 and may operate along a length of track 22 that may be adjacent to maintenance stations, described below. The primary transfer table 20 may facilitate the movement of railcars between the inbound queues 14 and the maintenance stations 24. The maintenance stations may include, but may not be limited to: repair stations 28a–28e, an interior blast station 30, an exterior blast station 32, an exterior paint station 34, interior paint stations 35a–35c, cure stations 36a–36c, and an assembly and test station 37.

A secondary transfer table 38 may be located within the transfer area 18 and may also operate along track 22. The secondary transfer table 38 may facilitate movement between the inbound queues 14a–14d, a cleaning facility 42 and/or the outbound railway 44. Although the primary transfer table 20 and the secondary transfer table 38 may have dedicated responsibilities as noted above, either transfer table may be capable of maintaining the entire transfer of railcars in the event of equipment breakdown or for any other reason.

In a preferred embodiment, the primary transfer table 20 and the secondary transfer table 38 may be identical in size, shape, and performance. The tables 20,38 may be disposed on the track 22 within a shallow pit. The primary transfer table 20 and secondary transfer table 38 may be approximately sixteen feet wide by eighty feet long with a maximum capacity of sixty tons. However, any size and shape may be implemented that may be apparent to those skilled in the art. A motor, preferably a forty horsepower variable frequency electric driven motor (not shown), may drive each transfer table 20,38 at a plurality of speeds, preferably between about thirty and one hundred and fifty feet per minute. Additionally, the transfer tables 20, 38 may be capable of soft starts, electric braking, and loading and unloading railcars via a mounted railcar mover (not shown) thus eliminating the need for track mobiles and similar equipment. Further, railcars may be loaded and unloaded from either side of the transfer tables 20,38. It should be noted, however, that any system for moving the tables 20,38 and/or loading and unloading mounted railcars may be utilized and this invention is not meant to be limited as herein described.

Although the maintenance facility 10 may be designed in any manner apparent to those skilled in the art, the maintenance facility 10 may preferably have two rectangular buildings located on opposite sides of the track 22. On a first side 13 of the track 22, the maintenance facility 10 may include a series of the repair stations 28a–28e that may be equipped to process any type of railcar, such as, for example, tank cars and hoppers. On the opposite side 15 of the track 22, the maintenance facility 10 may include series of stations (as described below) that may be required to perform interior and exterior paint operations and cleaning. However, any type of station may be located on either side, or in any other location, as may be apparent to those skilled in the art. Generally, the design of the maintenance facility 10 and the placement of the maintenance stations therein allow for efficient movement of railcars therethrough.

The repair stations 28a–28e may preferably be located adjacent to the transfer table area 18 or in any other location apparent to those having skill in the art. Maximum efficiency and utility may be gained by equipping each repair workstation 28a–28e with general-purpose railcar maintenance equipment that may be capable of servicing a plurality of types of railcars serviced by the maintenance facility 10. For example, equipment located in each repair workstation 42 may include: cranes, welding equipment, jacks, and/or other various mechanical tools apparent to a person having ordinary skill in the art of maintaining railcars. Railcars having damage or damaged parts may be repaired in the repair stations 28a–28e.

Additionally, the present invention illustrated in FIG. 1 may preferably include an administrative building 43 having offices therein and a service parts inventory storage area 45 located adjacent to the repair stations 28a–28e. The service parts inventory storage area 45 may contain a plurality of parts useful for repairing or otherwise maintaining railcars. Generally, a repair station worker may retrieve parts from within the service parts inventory storage area 45 to repair railcars within the repair stations 28a–28e. Moreover, a maintenance area 48 may be provided that may house equipment for repairing specific parts on the railcars, or for any other purpose that may be apparent to those skilled in the art. For example, damaged valves on tank cars may be repaired by being removed from the tank cars in one of the repair stations 28a–28e. The valve may then be taken to the maintenance area 46 for repair.

The present invention may further include a cleaning station 42 adjacent to the transfer table area. The cleaning facility 42 may be capable of cleaning any type of railcar serviced by the maintenance facility 10. Generally, the cleaning station 42 may include a plurality of bays for servicing a plurality of railcars at any one time. The cleaning station 42 typically contains equipment necessary to implement the cleaning of any type of railcar, such as, for example, solvents, detergents, water hoses, vacuums, drains and/or any other equipment apparent to those skilled in the art.

In a preferred embodiment, the cleaning facility 42 may be a simultaneous cleaning facility capable of cleaning a plurality of railcars at the same time. The cleaning facility 42 may include a plurality of high-pressure hot water cleaning systems. Each system may be equipped with a high-pressure hot water injector having pressure gauges, steam and water supply inlets, air compressors, discharge piping and/or any other equipment that may be apparent to those skilled in the art. An overhead mezzanine (not shown) may allow easy and safe access to the railcars for access to the tops of the railcars and to any hatches that may be contained on the railcars. A crane may be installed on the mezzanine for the easy removal of cover plates, valves, hatch covers or any other part or component of the railcar.

The cleaning facility 42 of the preferred embodiment may be controlled by a central programmable logic control ("PLC") system (not shown). The PLC system may be capable of automatically routing wastewater and rinse water into and/or away from the cleaning facility 42. Further, the PLC system may monitor temperature and flow rate of the water, and may electronically record the individual railcar cleaning time periods. Therefore, efficiency may be maximized and data relating to various parameters, such as, for example, amount of water used, time period for cleaning and/or other parameters may be measured and recorded.

Furthermore, the cleaning facility 42 of the preferred embodiment may include a cleaning pad (not shown) that may have suitable grating to allow for easy discharge of wastewater to an underground drainage system (not shown). The drainage system may be provided beneath the four railroad tracks at the cleaning station to convey the wastewater and/or rinse water to a sump by gravity flow and for discharge according to safe environmental practices. For example, the repair facility 10 may include an onsite wastewater treatment plant (not shown) for treating the wastewater generated by the cleaning facility 42. Alternatively, the cleaning facility 42 may tie into an existing wastewater system such as, for example, a municipal wastewater treatment facility.

Still referring to FIG. 1, the interior blast station 30 may be utilized to strip the interior of a railcar. The blast station 30 may send a powerful jet of steam, water, metal grit, sand or other material into the interior of the railcar to remove any material therein and/or remove any protective coatings adhered to the walls and/or other components of the railcar. Specifically, the blast station 30 may be utilized to remove liners that have been coated to the interior of the railcar that may be damaged or otherwise unfit for use within the railcar.

For example, FIG. 2 illustrates an embodiment of the interior blast station 30. The interior blast station 30 may include a plurality of railcar bays 100–104 having railcars 110–114 therein. The railcar bays 100–104 may provide space for blasting one railcar while cleaning another railcar that may already have been blasted. A blasting operation may be performed to remove a faulty lining of a railcar before a new lining may be applied. The blasting operation may be accomplished by any means obvious to one with skill in the art, such as, for example, metal pellet or metal grit blasting. As noted, a preferred embodiment of the interior blast station 30 may include a plurality of railcar bays 100–104. More preferably, a robotic blast arm 106 in a first railcar bay 100 may enter the railcar and perform a blast cycle, preferably for about two hours, in a first railcar while a high powered vacuum in a second railcar bay 102 (not shown) may perform a cleaning cycle, preferably for about four hours, in a second railcar. A third railcar bay 104 may be used for transferring railcars into and out of the interior blast station 30.

The robotic blast arm 106 may be moveably mounted within a truss system 108 that may allow the robotic blast system 106 to service all three railcar bays 100–104. The moveably mounted robotic blast arm 106 may allow each of the bays within the interior blast station 30 to be used for prepping, blasting, and/or cleaning, thereby eliminating the need to transfer the railcars between bays within the interior blast station 30.

In a preferred embodiment, the robotic blast arm 106 may be any type of cleaning arm that may be designed to enter the top hatch of a tank car or via any other hatch, door or opening. The arm 106 may be hinged at various locations to allow the arm to gain access to the interior of the railcar. Further, the arm 106 may telescope forward to reach a specified distance within the railcar. In a preferred embodiment, the arm 106 may reach an entirety of the interior of the railcar or may come within a specified distance, such as within eighty inches or any other distance, of the far ends of the tank car. The arm 106 may be equipped with two blast nozzles that may operate at a specified pressure.

In a preferred embodiment, the arm 106 may include ⅝" blast nozzles that may operate at about 150 psi, however any size nozzle and pressure may be implemented according to this invention. The arm 106 may be capable of rotating ninety degrees while oscillating the blast nozzles to ensure a thorough and even coverage of the blast within the railcar. The process time may be any time period that may fully and efficiently blast and clean the interior of the railcar. As noted in the preferred embodiment, the estimated process time of the interior blast operation may be about two hours, followed by about a four-hour clean period. The cleaning operation may be completed using a high powered vacuum (not shown) to remove the blasting material, such as metal grit, sand or water, and any residue that has been blasted from the interior of the railcar.

Referring again to FIG. 1, the exterior blast station 32 is illustrated and may be used to prepare railcars for an exterior paint or coating operation. Generally, the exterior blast station 32 may contain any equipment useful for removing a coating and/or any other residual material from the exterior of a railcar. In a preferred embodiment, the exterior blast station 32 may have space for two railcars. A first bay (not shown) within the exterior blast station 32 may be utilized for the blasting of the exterior of the railcar. Moreover, a second bay (not shown) within the exterior blast station 32 may be utilized to provide light repair to the railcar prior to or after the blasting of the railcar. The second bay may allow repairs to be made to the railcar without using one of the repair stations 28a–28e. This may prevent delays that may occur when a mechanical defect is discovered on a railcar that has been loaded into the exterior blast station 32. If a railcar loaded into the exterior blast station 50 requires mechanical repair prior to the exterior blasting operation, the railcar can be transferred forward into the second bay for mechanical repair allowing the first bay to continue the blasting operation without a delay.

An air compressor area 33 may be disposed adjacent to both the interior blast station 30 and the exterior blast station 32. The air compressor area 33 may contain an air compressor (not shown) and any other equipment for providing the requisite air pressure necessary for the blasting equipment.

An exterior paint station 34 may be provided within the facility 10 for providing an external coating of paint or other material to the railcar. Typically, a railcar will receive an external coating after blasting has removed a previous coating. Of course, railcars may be coated within the exterior paint station 34 without being blasted in the exterior blast station 32. The exterior paint station 34 may contain equipment and any other materials apparent to those skilled in the art for providing external coatings to railcars. In a preferred embodiment, the exterior paint station 34 may have an open ceiling having a filter therein to facilitate direct airflow through the entire length of the exterior paint station 34. The exterior paint station may further have a plurality of pneumatic lifts to enable a painter access to most, if not all, of the exterior of the railcar without using ladders and/or catwalks.

Internal paint stations 35a–35c may also be provided to allow liners and/or coatings to be administered to the interiors of the railcars that may cycle through the facility 10. Typically, a railcar may receive an internal coating of paint after having been blasted and cleaned in the interior blast station 30. Of course, the railcar may receive a liner or a coating of paint without being blasted in the interior blast station 30; it is not necessary, however, it is preferable, for a railcar to be blasted and cleaned first. Further, any number of internal paint stations may be constructed depending on the particular needs of the facility 10 and the invention should not be limited as herein described.

A paint kitchen 37 may be disposed adjacent both the exterior paint station 34 and the interior paint stations 35a–35c. The paint kitchen 37 may contain any equipment and materials necessary to allow an individual to develop desirable coating materials for placement of the coating materials onto or within the railcars.

Paint cure stations 36a–36c may be provided for allowing railcars having been coated in the exterior paint stations 34 or the interior paint stations 35a–35c to be cured thereby setting the coatings on the railcars. The cure stations 36a–36c may contain any equipment or other materials necessary to provide a suitable cure for the coatings. For example, the cure stations 36a–36c may contain an air circulation system (not shown) for circulating air, such as, for example, heated air, within and around the railcar to aid in curing the coating of paint or other materials onto the railcar.

Still referring to FIG. 1, the lining queue area 26 may be provided to prevent works-in-process from draining the efficiency of the repair workstations 28a–28e. It has been determined that the interior blasting operation that may be implemented within the interior blast station 30 may cause a bottleneck within the maintenance facility 10 since it the time period required to complete the interior blasting operation is relatively longer than any other operation implemented in any other maintenance station. Railcars requiring service from the interior blast station 30 may be stored within a set of tracks within the lining queue area 26 prior to blasting so that the railcars do not delay the services of, for example, one of the repair stations 28a–28e. Further, holding the railcars within the lining queue area 26 may allow a railcar to enter the interior blast station 30 in a quick and efficient manner due to the proximity of the railcar to the interior blast station 30 and also because a railcar would be readily available to enter the interior blast station 30 immediately. Moreover, after the railcar has been blasted in the interior blast station 30, painted and cured, the railcar may be stored within the cure queue area 27. These queue stations 26,27 may allow a railcar to be stored and therefore not take up space within one of the stations that may be utilized for another railcar.

In a preferred embodiment, the lining queue area 26 and/or the cure queue area 27 may have space for any number of railcars within the queues. When a railcar is transferred from the lining queue area 26 to the interior blast station 30, the available space in the lining queue area 26 may be filled by transferring a railcar from the inbound queues 14a–14d or one of the repair workstations 28a–28e to the lining queue area 26 or any other station within the facility 10 on a first come, first serve basis. Moreover, when a railcar is transferred from the cure queue area 27 to one of the cures stations 36a–36c, the available space within the cure queue area 27 may be filled by transferring a railcar from the exterior paint station 34 and/or the interior paint stations 35a–35c.

There may be other queue areas provided within the facility 10 as may be apparent to those having ordinary skill in the art. Typically, the queue areas are designed to provide areas for storing railcars so that the railcars do not take up space within the maintenance stations within the facility, thereby allowing railcars to quickly and efficiently move through the facility 10.

The assembly and test station 37 may be utilized to reassemble railcars after repair, cleaning, painting, coating, lining and/or any other type of maintenance that may have been performed on the railcar. Further the assembly and test station 37 may be utilized to test the railcars to verify that the maintenance to the railcars was successful. For example, if a lining was coated to the interior of a railcar, then the lining may be tested to ensure that the lining has been properly applied. Generally, testers may determine whether the railcar has, in fact, received the maintenance required. Further, testers may determine whether the maintenance performed on the railcars meets predefined standards of acceptability. Standards may include internal company standards or may be specified by governmental bodies or agencies or other governing bodies.

In the preferred embodiment of the repair facility 10, safety may be enhanced through the use of video equipment designed to monitor all processes that may require a person to be inside railcar. Such operations may include the interior cleaning process that follows the interior blast operation and the interior paint operation. Remote video may provide full visual contact for all areas of the interior tank and may allow a human observer, who has limited sight access, to be deployed to another operation within the repair facility 10.

After a railcar has had maintenance performed thereon and has been tested and/or reassembled in the assembly and test station 37, the railcars may exit the railcar maintenance facility 10 via an outbound railway 44. The outbound railway 44 may be connected with the assembly and test station 37 or may otherwise be connected to the transfer area 18, as shown in FIG. 1. The transfer tables 20,38 may transport a railcar to the outbound tracks 44 for exiting of the railcar from the railcar maintenance facility 10.

Routing Patterns Within the Maintenance Facility

Generally, the routing of railcars through the maintenance facility 10 is dependent on the type of railcar, the product type within the railcar, and the maintenance work that may be necessary for the railcar. For example, types of railcars may include tanks, pressurized tanks, hoppers and/or any other type of railcar apparent to those skilled in the art. The railcars may carry a plurality of different product types such as, for example, food grade commodities such as corn syrup sweeteners, citric acid, starches and ethanol. Moreover, the railcars may carry hazardous materials such as products for oil refining industries. Railcars may be routed through the maintenance facility based on whether the railcars require repairs, such as heavy repairs for railcars that are highly damaged, or light repairs, internal blasting, external blasting, cleaning material, painting, external painting and paint.

FIGS. 3–6 illustrate particular routing patterns that may be implemented for particular types of railcars that may have particular maintenance requirements. It should be noted, however, that any type of railcar may be serviced by the maintenance facility 10 in any routing pattern that may be apparent to those skilled in the art. The invention should not be limited as herein described with respect to the particular routing patterns.

Figure 3:
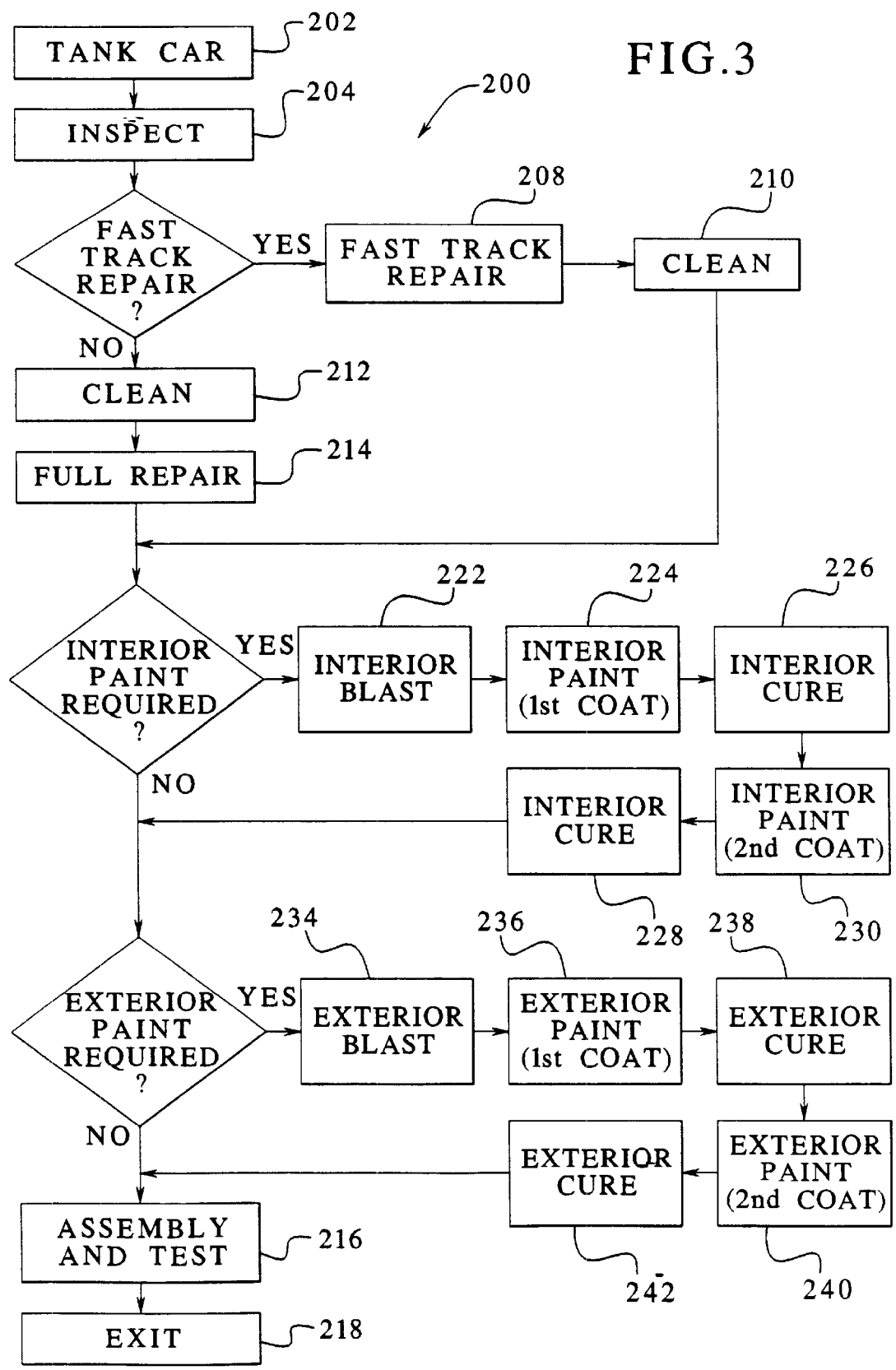
FIG. 3 illustrates a flowchart for a tank car that requires specific maintenance performed thereto in an embodiment of the present invention.

FIG. 3 illustrates a routing pattern 200 for a tank car 202. The tank car 202 may be any type of tank, such as pressurized or unpressurized tank cars, attached to a set of trucks for transporting the tank on a set of rails. Moreover, the tank car 202 may require heavy repair or light repair and may further require internal and/or external paint or lining.

The tank car 202 may enter the maintenance facility 10 via the set of rails 12a or 12b. The tank car may have been inspected via an inspection step 204 at an inspection station (not shown). Preferably, the railcars may enter the inspection facility via a single railway (not shown). After the railcars are inspected at the inspection station, then the railcars may be transferred to the particular set of rails 12a or 12b based on the results of the inspection. If the tank car 202 requires "heavy" repair, due to large amounts of damage to the tank car 202, then the tank car 202 may be routed via inbound railway 12b and may further be queued in inbound queue 14c,14d until one of the repair stations 28a–28e opens to allow entry of the tank car 202 thereinto.

Moreover, if the tank car 202 requires "light" maintenance, the tank car 202 may be routed to the maintenance facility 10 via the inbound railway 12a where the tank car 202 may be queued in queues 14a,14b until one of the repair stations 28a–28e that may be capable of handling the light repair becomes vacant. It should be noted that repair stations 28a–28e may be specifically designated either for "heavy" or "light" maintenance depending on the volume of railcars being served at the maintenance facility 10. Alternatively, and in a preferred embodiment, each of the repair stations 28a–28e may be capable of handling any type of railcar having any type of repair designation.

Moreover, tank cars may enter the maintenance facility 10 in a wrecked state and may receive a "wrecked" designation via the inspection step 204. The "wrecked" designation may indicate that the tank car requires a thorough cleaning and major repairs, interior blasting and painting, exterior blasting and painting, and assembly/testing, as will be discussed more fully below.

Generally, a determination as to whether the tank car 202 requires "heavy" or "light" repair, interior lining and/or exterior painting may be made at the inspection step 204. This determination sets the tank car 202 on a particular path through the maintenance facility where the entirety of the required maintenance may be performed thereon. The determination allows inspectors to assign a designation to the tank car 202 based on the particular routing pattern necessary prior to entering the maintenance facility 10.

The particular designation may determine the precise routing pattern that is necessary for the tank car 202 to receive the necessary maintenance. The routing pattern designation may be marked on the tank car 202 to be seen by railcar handlers throughout the maintenance facility 10 so that the tank car 202 is routed to the proper maintenance stations. The designation may be removably attached to the tank car 202 with magnets or may constitute any other designation device apparent to those skilled in the art. Hence, a railcar maintenance worker within the railcar maintenance facility 10 may see the designation and the required maintenance steps and route the railcar accordingly through the maintenance facility 10.

If only "light" repair is necessary, then the tank car 202 may be routed via the "fast track" repair pattern 208. The fast track repair pattern 208 merely requires that the tank car 202 enter one of the repair stations 28a–28e and be visually inspected for minor damage such as if the tank car 202 requires replacement parts for valves and/or the like. The tank car 202 may then be repaired. Moreover, the tank car 202 is then cleaned via step 210. It should take a relatively short period of time for the tank car 202 to enter and exit a repair station 28a–28e for fast track repair.

If "heavy" repair is required, then the tank car 202 may be cleaned via step 212 and further may be fully repaired via step 214. The "full repair" step 214 may require various parts of the tank car 202 to be disassembled. Moreover, major pieces of the tank car 202 may be repaired and/or replaced depending on the type of damage done. The time period may be significantly longer than with fast track repair.

After the tank car 202 is repaired via the fast track repair step 208 or the full repair 214, then the tank car 202 may be removed from the repair station 28a–28e. If the tank car 202 does not require interior or exterior painting (as noted below) then the tank car 202 may proceed directly to an "assembly and test" step 216 whereby the tank car 202 may enter the assembly and test station 37. After the tank car 202 is reassembled and/or tested the tank car 202 may be removed from the assembly and test station 37 via one of the transfer tables 20,38 and may exit the maintenance facility 10 via step 218 on the outbound railway 44.

However, in many instances, the tank car 202 may need interior painting or lining. The determination of whether the tank car 202 needs interior painting or lining may be made via the inspection step 204. If the tank car 202 requires interior painting or lining then the tank car 202 may be transferred to the interior blast station 30 where the interior of the tank car 202 may be blasted via an interior blast step 222 by metal grit, pellets, sand or any other material apparent to those skilled in the art for stripping any paint or lining that may be adhered to the interior of the tank car 202. Moreover, the interior may then be cleaned via the vacuum. It should be noted that a plurality of tank cars may be located within the interior blast station 30. For example, as noted above with reference to FIG. 2, a tank car may be blasted in the first bay 100, a second tank car may be cleaned in the second bay 102, and the third bay 104 may be used to transfer tank cars into and out of the interior blast station 30.

If there is no bay available to conduct the interior blast via step 222, then the tank car 202 may be held in the lining queue area 26 (as shown in FIG. 1). The lining queue area 26 may hold and store the tank car until a bay in the interior blast station becomes available. This may allow the tank car 202 to be removed from its repair station 28a–28e and held without effectively blocking the repair station 28a–28d from being used for other railcars. Therefore, railcars may move through the maintenance facility 10 without being bottlenecked at the interior blast station 30.

After the interior of the tank car 202 is blasted and cleaned, the tank car 202 may be transferred to an interior paint station 35a–35c where a first coat of a lining may be coated via step 224. After the interior coating or lining is painted, the tank car 202 may be cured in one of the cure stations 36a–36c.

After the tank car 202 has been cured via the interior cure step 226, the tank car 202 may be transferred back to one of the interior paint stations 35a–35c for a second application of paint via step 228. However, if no interior paint station 35a–35c is available to take the tank car 202 for a second coat, then the tank car 202 may be held within the cure queue area 27 until an interior paint station 35a–35c becomes available. This may allow tank cars to be removed from the cure stations 36a–36c and not block the use of the cure stations 36a–36c. After the second application of paint is applied to the interior of the tank car 202, the tank car 202 may be cured a second time via a second interior cure step 230 via one of the cure stations 36a–36c.

If needed, the tank car 202 may have painted on its exterior an application of paint. The determination as to whether the tank car 202 needs exterior paint may be made via the inspection step 204. If a tank car 202 requires exterior paint, then the tank car 202 may be transferred to the exterior blast station 32 where the tank car 202 may be blasted via step 234 by metal grit, pellets, sand or any other material that may remove the previous painted coating on the exterior of the tank car 202. A vacuum may then be utilized to clean the exterior of the tank car 202 thereby removing the residual metal grit, pellets, sand or other material and any paint that may have been removed from the tank car 202. Then, the tank car 202 may be transferred to the exterior paint station 34 for a first exterior paint application step 236. The first exterior paint application may then be cured via an exterior cure step 238, whereupon a second exterior paint coat may be applied via step 240. The second exterior paint coat may be cured via step 242.

After the exterior has been painted, then the tank car 202 may proceed to the "assembly and test" step 216 to be reassembled, if necessary, and tested to verify that the required repairs have been accomplished and that the internal lining or coating adequately holds product without leakage, as noted above with reference to FIG. 1. After the tank car 202 has been reassembled and/or tested via the "assembly and test" step 216, then the tank car 202 may be transferred to the outbound railway 44 via the "exit" step 218.

It should be noted that tank cars requiring a plurality of services may be routed through the maintenance facility 10 via the routing pattern illustrated in FIG. 3. For example, as noted above, tank cars requiring light or heavy services may be routed via routing pattern 200. However, tank cars that have been wrecked through train accidents or that may have extremely serious damage may also be routed via the routing pattern 200.

Figure 4:
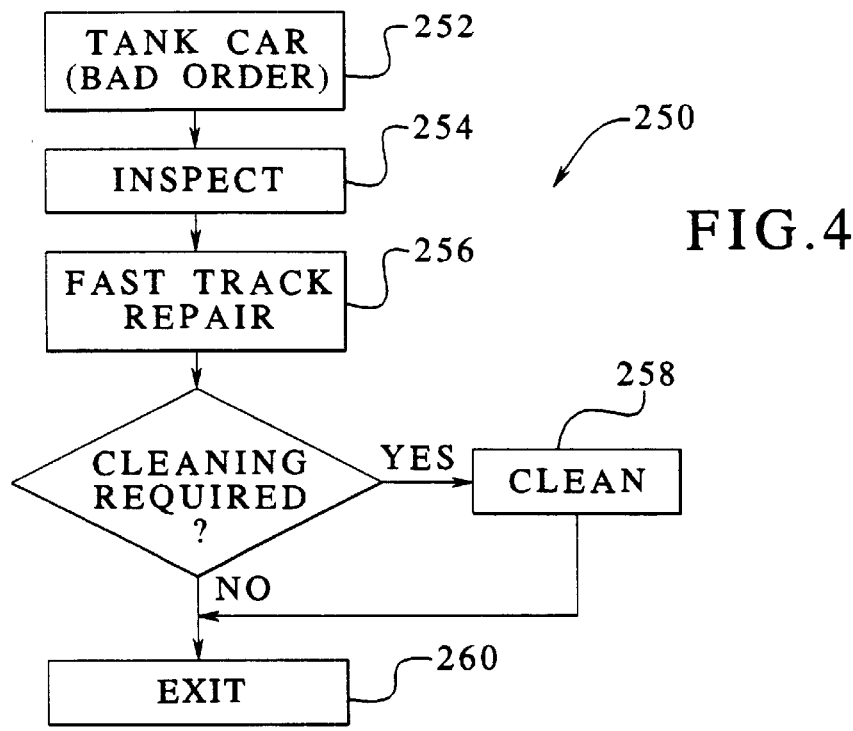
FIG. 4 illustrates a flowchart for a bad order tank car that requires specific maintenance performed thereon in another embodiment of the present invention.

A "bad order" tank car may refer to a newly produced tank car that may have minor defects in parts on the tank car and therefore may require minor maintenance. A "Bad Order" tank car routing pattern 250 is illustrated in FIG. 4. A bad order tank car 252 may be inspected via step 254 to determine its routing pattern through the maintenance facility 10. However, since a bad order tank car 252 is newly produced and only requires minor maintenance, then the bad order tank car 252 may be automatically designated for fast track repair via step 256. Moreover, cleaning may be required as determined by the inspection step 254. If cleaning is required, then the bad order tank car 252 may be cleaned via step 258 at the cleaning station 42. The bad order tank car 252 may then exit the facility via step 260 on the outbound railway 44.

Figure 5:
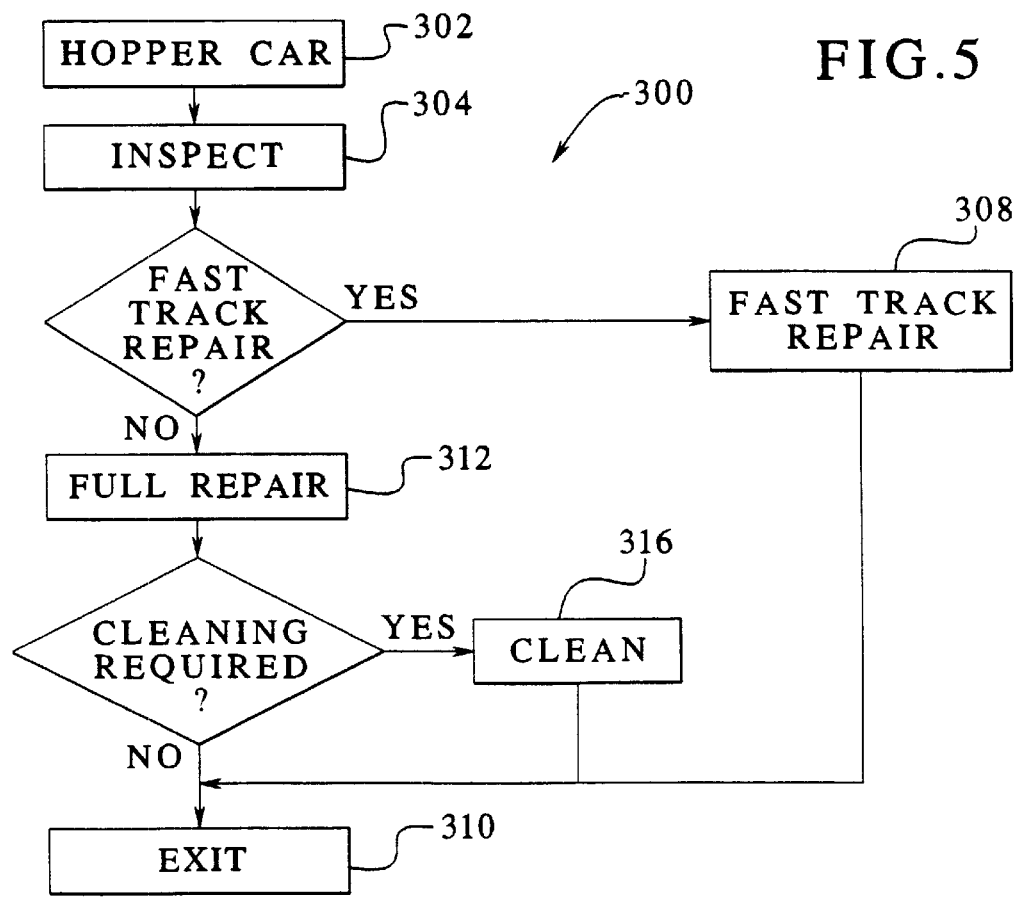
FIG. 5 illustrates a flowchart for a hopper railcar in an embodiment of the present invention.

Hopper railcars may also be serviced by the maintenance facility 10, as illustrated by the routing pattern 300 illustrated in FIG. 5. A hopper railcar 302 may be inspected via an inspection step 304 prior to entering the maintenance facility 10. As before with the tank cars noted above with respect to FIGS. 3 and 4, the hopper 302 may be inspected for a determination as to whether "heavy" repairs or "light" repairs are necessary. If "light" repairs are necessary, then the hopper may be designated to a fast track repair route via a "fast track" repair step 308. The hopper railcar 302 may then exit the facility via step 310 by being transferred to the outbound railway 44 via the transfer tables 20,38.

If the hopper railcar is not designated for fast track repair, then the hopper railcar may have "heavy" maintenance performed thereon via a "full repair" step 312. Further, after the full repair step 312, the hopper 302 may require cleaning via step 316. After the cleaning, the hopper 302 may exit the maintenance facility 10 via step 310 by being transferred to the outbound railway 44 by one of the transfer tables 20,38.

FIG. 6 illustrates a routing pattern 350 for a hopper railcar 352 that may be wrecked due to, for example, a train crash. An inspection step 354 may indicate what maintenance needs are required. Generally, wrecked hoppers require full repair via a full repair step 356. If the hopper railcar 352 requires an exterior painting then the exterior of the hopper railcar 352 may be blasted via step 360. The hopper railcar 352 may then be painted via step 362 and cured via step 364. As noted above with respect to FIG. 2, the hopper railcar 352 may be transferred via the transfer tables 20,38 to the exterior blast station 32, the exterior paint station 34 and one of the cure stations 36a–36c. The hopper railcar 352 may further be reassembled and tested via step 366 and may exit the maintenance facility 10 via step 368 via the outbound railway 44.

Maintenance Facility Management

The railcars described herein may be released into the maintenance facility 10 at a rate that maintains a constant level of work-in-process. In other words, there are certain stations within the maintenance facility that may cause "bottlenecks" if not managed properly. For example, the interior lining operation of tank cars, specifically, the interior blasting operation, carried out in the interior blasting station 30, may cause bottlenecks because many tank cars require this operation and it may take a relatively longer period of time to complete this operation as other operations, such as repairing and cleaning. Therefore, the introduction of railcars into the maintenance facility 10 must be monitored closely to ensure that tank cars awaiting interior lining are not causing delays in other areas of the maintenance facility 10. However, any maintenance station within the maintenance facility 10 may cause a bottleneck and this invention should not be limited as herein described.

To implement this system, the maintenance facility 10 may utilize a hybrid Constant Work-In-Process ("ConWIP") and kanban system. The ConWIP may be implemented at a bottleneck source within the maintenance facility, such as before the interior blast station 30 at the lining queue area 26. However, it should be noted that the ConWIP may be located at any maintenance station apparent to those skilled in the art as causing bottlenecks within the maintenance facility 10. Moreover, it should be noted that a plurality of ConWIPs may be utilized and implemented within the maintenance facility 10 at any maintenance station that may cause a bottleneck. Specifically, the ConWIP may be located at the lining queue area 26. As noted above, in a system such as the one described above with reference to FIGS. 1 and 2, bottlenecks may occur most frequently at the interior blast station 30. By placing the ConWIP system at the lining queue area 26, the interior blast station 30 may be efficiently managed to prevent tank cars from delaying other processes within the maintenance facility 10.

Generally, the ConWIP may be implemented to monitor the status of the bays 100–104 within the interior blast station 30 and/or the lining queue area 26. When the bays 100–104 and the lining queue area 26 are filled with tank cars either being blasted, cleaned or awaiting process, then the ConWIP may communicate to the inbound railways 12a,12b and/or inbound queues 14a–14d to not release any tank cars requiring a lining operation into the maintenance facility 10. Therefore, since the tank cars requiring the lining operation may also require repairing at a repair station 28a–28e, cleaning via the cleaning stations 42, and/or exterior painting via the exterior paint station 32, then the tank car will not be released into maintenance facility 10 thereby allowing the repair stations 28a–28e, the cleaning stations 42 and/or the exterior paint station 32 to remain free of these railcars and open to other types of railcars thereby eliminating the bottleneck.

As a complement to the ConWIP card "pull" and monitoring system noted above, kanbans may be used to prevent the transfer tables 20,38 from bringing railcars into the maintenance facility when no maintenance station is available. Each maintenance station may have a kanban to communicate whether a railcar may be transported thereto and loaded thereinto. For example, if the repair station 28a is filled with a railcar, then the kanban system may communicate to the inbound railways 12a,12b that no further railcar should be released to the repair stations 28a. The operator of the transfer tables 20,38 may then look for the next available repair station 28b–28e as indicated by the kanban system. If no repair station is available, then the railcar may remain in the inbound queue 14a–14d until a repair station 28a–28e is available.

Both the ConWIP and kanban systems may use any type of communication system apparent to those having ordinary skill in the art. However, a preferred embodiment may be a green light/red light communication system to communicate whether a railcar should be released into the maintenance facility 10. For example, at the bottleneck process (at the interior blasting station 30), the ConWIP may communicate, via a red light, that all bays and the lining queue area 26 are filled with waiting or in-process tank cars. Therefore, an operator at the inbound railways 12a,12b would know not to release a tank car requiring, specifically, a lining operation among other operations into any maintenance station within the maintenance facility 10. If the ConWIP is green, then the operator at the inbound railways may check the kanbans at any individual stations to determine where he should route the railcar. Further, if a kanban shows red, then the operator at the inbound railways 12a,12b would know not to release a railcar to that particular station. In an alternate embodiment of the ConWIP and kanban systems, there may be a lighted board or a computer screen showing the ConWIP and kanban systems and whether railcars may be released into the maintenance facility 10 and/or to any particular maintenance station.

An operator at the inbound railways 12a,12b would need to know how to route a railcar through the maintenance facility 10. Therefore, the operator would note the color of the attached routing schedule to move the railcars to the proper maintenance station. Further, it should be noted that any communication system may be utilized to indicate to a operator whether railcars should be released into the maintenance facility 10. Moreover, the ConWIP system may be implemented at any stage within the maintenance facility 10 as may be apparent to those skilled in the art for relieving the maintenance facility 10 of bottlenecks and other delays that may occur within the maintenance facility 10.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A Railcar Maintenance Facility Management System comprising:
   a railcar maintenance facility having a plurality of maintenance stations;
   a first maintenance station within the railcar maintenance facility;
   a first railcar requiring services of the first maintenance station;
   a first communication means associated with the first maintenance station wherein the first communication means signals to an operator of the maintenance facility whether the associated first maintenance station is available or unavailable to accept the first railcar and further if unavailable, then the first railcar is not released into the railcar maintenance facility;
   a second maintenance station within the railcar maintenance facility;
   a second railcar requiring services of the second maintenance station and further wherein the second railcar does not require the services of the first maintenance station wherein the release of the second railcar into the maintenance facility is independent of whether the first maintenance station is available to accept railcars.

2. The systems of claim 1 further comprising:
   a second communication means associated with each maintenance station for signaling whether each maintenance station is available or unavailable to accept railcars requiring services of each maintenance station.

3. The system of claim 1 further comprising:
   an inspection area for sorting railcars by their type and maintenance needs.

4. The system of claim 1 further comprising:
   a first queue area wherein the first queue area stores railcars waiting for a first maintenance station to become available.

5. The system of claim 1 wherein the first maintenance station is an interior blast station for removing interior linings from the railcars.

6. The system of claim 1 further comprising:
   an inbound queue area within the facility for holding railcars prior to entering the maintenance facility.

7. The system of claim 1 further comprising:
   a plurality of bays within the first maintenance system for holding a plurality of railcars requiring the services of the first maintenance station wherein the first communication means communicates whether the bays are available or unavailable to accept railcars.

8. The system of claim 1 wherein the first communication means comprises a red light and green light.

9. The system of claim 8 wherein the green light communicates that the particular maintenance station is available to accept railcars.

10. The system of claim 8 wherein the red light communicates that the particular maintenance station is unavailable to accept railcars.

11. The system of claim 1 wherein the maintenance stations comprise a first set of repair stations wherein railcars may be repaired and a second set of stations wherein a railcar may be painted.

12. The system of claim 1 wherein the first communication means comprises a red light and a green light wherein the red light indicates that railcars requiring the services of the first maintenance station should not be released into the maintenance facility and further wherein the green light indicates that the first maintenance station is available to accept railcars.

13. The system of claim 1 further comprising:
   a designation removably attached to the railcars to communicate the maintenance needs of the railcars.

14. A railcar maintenance facility management system comprising:
   a railcar maintenance facility comprising an inbound railway, an inbound queue area, a transfer area, a first set of maintenance stations, a second set of maintenance stations and an outbound railway;
   a first communication means connected to each maintenance station within the first set of maintenance stations wherein the first communication means communicates whether each maintenance station within the first set of maintenance stations is available to receive a railcar requiring services of the first set of maintenance station; and
   a second communication means connected to the second set of maintenance stations wherein the second communication means communicates whether the second set of maintenance stations is available to receive a railcar requiring services of the second set of maintenance stations and further wherein the second communication means communicates to an operator of the maintenance facility whether the railcar requiring the services of the second set of maintenance stations should be accepted into the maintenance facility.

* * * * *